Jan. 24, 1967 R. G. KNIGHT ETAL 3,300,587

AUTOMATIC TELECOMMUNICATION EXCHANGES

Filed July 5, 1963 2 Sheets-Sheet 1

Inventors
R. G. KNIGHT - M. C. BRANCH
By [signature]
Attorney

Inventors
R. G. KNIGHT - M. C. BRANCH
By [signature]
Attorney

United States Patent Office 3,300,587

Patented Jan. 24, 1967

3,300,587

AUTOMATIC TELECOMMUNICATION EXCHANGES

Ronald George Knight and Maurice Charles Branch, London, England, assignors to International Standard Electric Corporation, New York, N.Y., a corporation of Delaware Filed July 5, 1963, Ser. No. 292,887
Claims priority, application Great Britain, July 19, 1962, 27,783/62
7 Claims. (Cl. 179—18)

The present invention relates to automatic telecommunication exchanges.

According to the present invention there is provided an automatic telecommunication exchange, in which a connection between an inlet to the exchange and an outlet from the exchange is set up by establishing, for part at least of the communication path between said inlet and said outlet, two or more separate communication connections, and in which said two or more separate communication connections are established in parallel and independently of each other.

Figure 1:
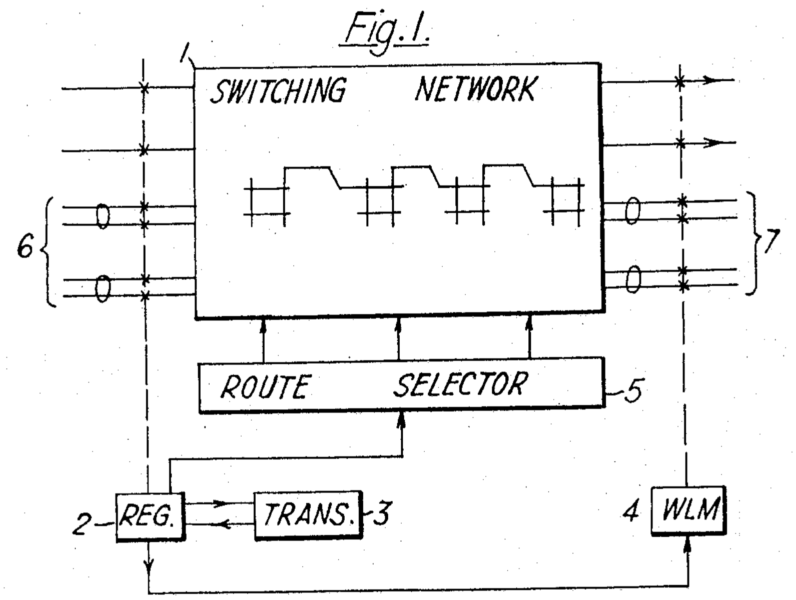
Figure 2:
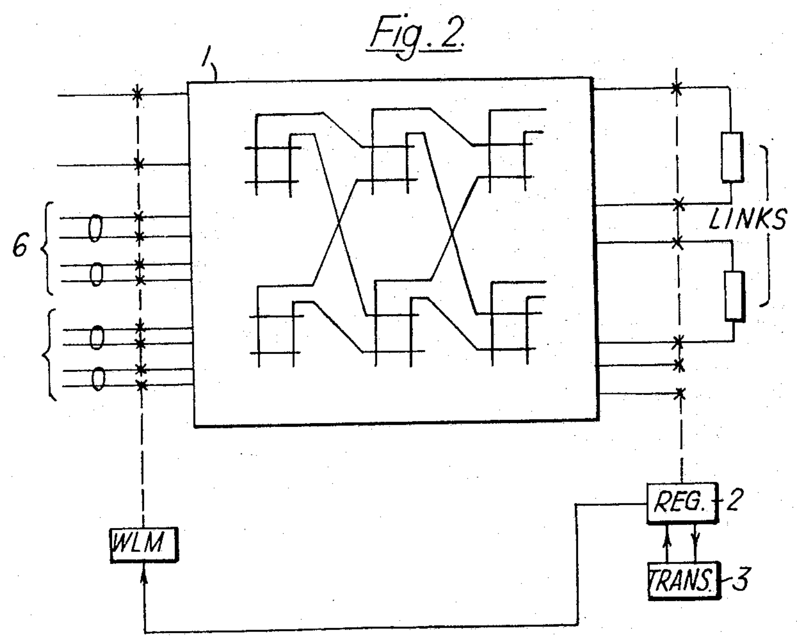
Figure 3:
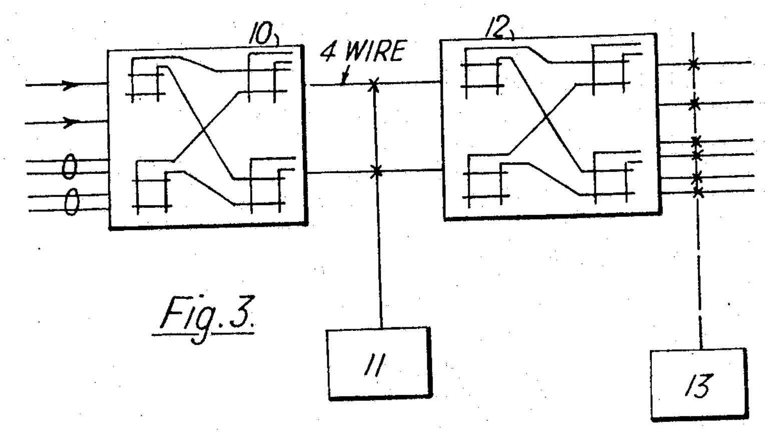

Embodiments of the invention will now be described with reference to the accompanying drawing, in which:

FIGS. 1, 2 and 3 each show schematically an automatic telecommunication exchange of the so-called space-division type, wherein the present invention is used.

Figure 4:
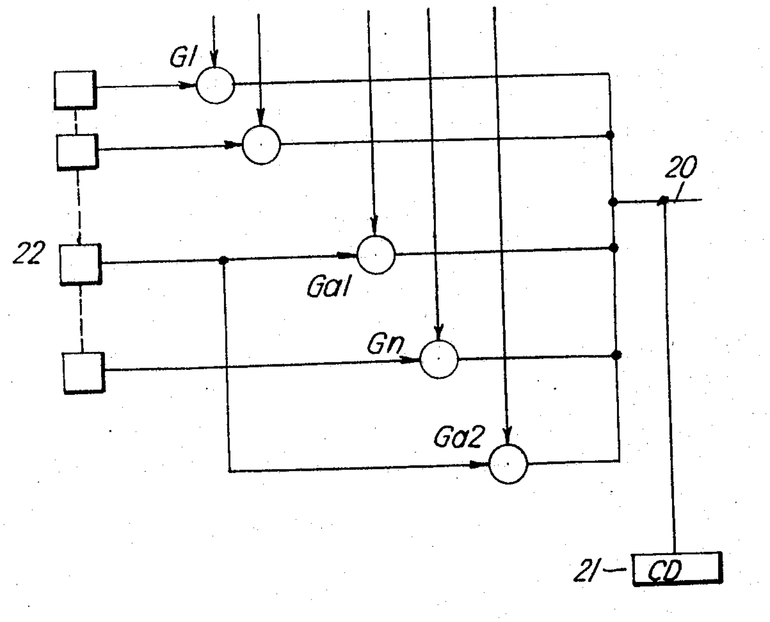

FIG. 4 shows schematically part of a time-division multiplex telecommunication exchange which also embodies the present invention.

The telephone exchange which is shown in FIG. 1, has a switching network represented by the block 1, via which lines incoming to the exchange can be connected to lines outgoing from the exchange. At this point it should be noted that the local subscriber's lines connected to the exchange are each connected to the block 1 both as an inlet thereto and as an outlet therefrom. The exchange described with reference to FIG. 1, employs as its switching network a co-ordinate array of cross-points each formed by one or more sealed contact devices which are electro-magnetically controlled. Such an exchange is often called a quasi-electronic exchange. When a subscriber initiates a call, his line is identified by equipment in the exchange and connected in known manner to a register such as 2, in which a wanted line's number can be received. On reception of the exchange code of that number, the register 2 seizes a free translator such as 3, which receives as much as is necessary of the wanted number to determine the call's routing and from which the register receives a translation which designates the route to be used by the connection.

In due course, the register seizes a wanted line marker 4 which marks the outlet from the block 1 to be used for a connection, this being the wanted line in the case of a local call and a junction in the case of a call to another exchange. As an alternative the operation of the wanted line marker 4 could be controlled directly from the register 2. A route selector 5, which is common to the switching network 1, now sets up a connection between the calling subscriber's line and the wanted outlet. No call setting occurs if the wanted line, or all junctions in the wanted direction are busy. This occurs in a manner known per se, and the connections through the switching network are established on a one-at-a-time basis. Thus a single route selector can function to control the establishment of a large number of connections through the exchange, since it works at "electronic" speeds.

Although the majority of connections in a local area telephone exchange network only require two-wire switching for speech transmission, a number of four-wire junctions exist. Furthermore, there is a growing use of four-wire transmission for shorter junctions than previously used, and consequently an increasing requirement for four wire transit or tandem switching through local exchanges. For the majority of calls, the incoming junctions would be switched to two wires for connections to local subscribers, and outgoing junctions would be switched to two wires for connections from local subscribers, and only in a minority of cases would these same junctions have to be connected together on a four-wire basis.

In the exchange described with reference to FIG. 1, a number of four-wire junctions are indicated at 6 and 7, and when a call incoming to one of these exchanges seizes a register such as 2, the register in effect notes that the call is from an incoming junction. If the translation indicates to the register that the connection is to be extended to one of the four-wire junctions such as 7 outgoing from the exchange, a further special recording is made in the register 2. As a consequence of the recordings which indicate that two four-wire junctions are to be connected together, the register, the marker and route selector 4 and 5 cause two separate connections to be established. The first of these connections is set up between the "go" channel of the incoming four-wire junction and the "go" channel of the outgoing four-wire junction, while the other connection is established between the incoming junction "return" channel and the outgoing junction's "return" channel. Each of these connections is established by the route selector separately from the other one. Furthermore, since the route selector works on a "one-at-a-time" basis, it will be seen that the switching paths used for these two connections may well be wholly independent, and in fact are regarded by the switching equipment as if they were completely separate connections.

The above technique for interconnecting two four-wire junctions is also used in a system in which each line is connected to one end only of the switching network. In such a case each connection between two local subscriber's lines involves a connection from the caller through the switching network to a link from which a further connection is set up to the wanted line. Other connections could also use this technique of two "passes" through the network, although in a transit connection it would be possible for the first "pass" to give access to an outgoing junction. In such a system the initiation of a call may cause the caller to be connected to a register at the "link" side of the switching network; when the call is ultimately set up this initial connection is in most cases broken down.

An exchange of this type is indicated schematically in FIG. 2: although the switching network is indicated as including three stages of co-ordinate switches, it could (and this applies equally to FIG. 1.) include two or more stages, each of which stages includes two sets of co-ordinate switches interconnected as a primary/secondary network.

An important advantage attained by the application of the invention to a non-multiplex system is that in a transit connection through the exhange, hybrid transformers are eliminated.

Although reference has been made above to two wire circuits this applies to the speech path: for control purposes the connections using two wires for speech may use three or even four wires altogether. Thus, in an exchange of the so called quasi electronic type a third wire is needed for P wire functions and a fourth for control of the reed relays whose contacts form the cross-points. In such a case the four-wire speech circuits (the junctions) to be connected would, within the exchange, call for two four-wire paths (each including two speech path conductors) to be switched. Where normal connections are set up within the exchange as single wire connections with earth return, the two four-wire junctions such as described above would be interconnected via two speech connections each being set up as a single-wire with earth return connection.

Referring to FIG. 3. in this system the subscribers lines or incoming junctions, when calling are connected via initial switching stages 10 (shown as two sets of co-ordinate switches connected as a primary/secondary switching array) to registers such as 11 into which wanted numbers pass. In a transit connection such a wanted number causes a connection to an outgoing junction. The calls are set up via a second set of switching stages 12 to the wanted line or a junction giving access thereto. The transmission of dialed digits is controlled by a sender such as 13, seized in the case of an outgoing connection. To cater for all signalling needed the connection from a register such as 11 to a sender such as 13 is eight-wire whereas it is only four wire from the subscriber or incoming junction to the register.

The essential difference between this arrangement and the arrangements of FIGS. 1 and 2 is that the use of separate connections for the same call is only for part of the passage through the exchange.

In the arrangements described above, it is assumed that the connections through a switching network are set up on a random non-numerical basis. That is, when the two ends are marked the route selector chooses any free route therebetween at random. However, the invention is not limited in its application to such system.

The use of the separate connections in parallel for interconnecting two four-wire junctions can be conveniently used in any system where the incoming and outgoing terminations are known before the path selection is made, that is, where "end marking" as described above, is used, and also where it is possible to have more than one connection existing at the same time to the same terminating device. This is, of course, the case in many co-ordinate switch systems. In the latter case it should be mentioned that the invetnion can be applied to a line-finder system using cross-bar switches or their electronic equivalent, but it is not applicable where line switches are used. Furthermore, it will be apparent that a connection between two four-wire junctions can be established by the technique of setting up two completely independent connections in a time-division multiplex telecommunication exchange, as well as in a so-called space-division exchange.

This arrangement for interconnection of junctions is especially convenient for an electronic or quasi exchange in which all connections are betwen junctions, i.e. for a transit exchange.

In FIG. 4 there is shown a very simplified form, part of a telephone exchange using time-division multiplex technique, wherein a group of subscriber's lines is served by a time division multiplex system each time position pulse of which is allocated to one of the subscribers lines. Such a multiplex system is known as a fixed-pulse system. Each subscriber's line can be connected to the common multiplex highway 20 via a gate such as G1 or G*n* allocated thereto, the gates being opened sequentially by time-pulses applied thereto over the gate's control lead. The vertical connections to these gates are the control leads and they are fed by pulses occurring at different time positions in a repetitive cycle of time positions. When a subscriber initiates a call, the next occasion on which his line is sampled by his gate results in the appearance of a pulse on the highway 20, and this pulse is noted by a call detector 21, which causes the calling subscriber's line to be connected to a register. The line is then connected to the appropriate outlet from the exchange in well-known manner.

In many proposals for the application of time-division techniques to telephone exchanges, a bandwidth of 300 to 3,400 cyles is adequate for conveying speech, and this allows of a sampling speed of 10,000 cycles. That is, each subscriber's line is sampled 10,000 times per second. However, although this sampling speed gives a bandwidth which is fully adequate for normal speech transmission, it may be desirable for special purposes such as data transmission or for the transmission of programmes intended for radio or television broadcasting to increase the bandwidth on selected connections.

In the exchange of FIG. 4, this is accomplished by allocating to a special line such as 22 two sampling pulses instead of the normal one, this being indicated in FIG. 2 by the presence of two gates G*a*1 and G*a*2 between the line 22 and the highway 20. Consequently the sampling frequency is increased from 10 to 20 kilocycles: the pulses allocated to the special line are so chosen as to be equi-distant from one another. Consequently the interval between two consecutive samplings of a special line is halved. When a connection from a special line such as 22 is required, the controlling equipment, which includes the call detector 21, sets two calls through the system each of which uses one of the two pulses assigned to the particular line in the normal manner. That is, the controlling equipment does not "know" that there is anything special about the connection: all it "knows" is that it has to set up two connections, one at the time position for the gate G*a*1, and one at the time position for the gate G*a*2. Each of these connections is set up by the controlling equipment completely independently of the other. The line circuit used for the special cases such as the line 12, is specially modified as compared with the normal line circuits so as to cater for the increased bandwidth which is permitted by the higher sampling rates.

Where the bandwidth needed by a special subscriber is such that two time positions as just described is inadequate, three or even more could be allocated to that line. These three or more time positions are then equally spaced in the time cycle (or as nearly equally spaced as possible).

Although the description briefly given above has referred to the application of the technique of increasing bandwidth by setting up two or more connections in parallel to a so-called fixed pulse system, it is also applicable in the so-called variable pulse system. In a variable pulse time-division multiplex system, the time positions at which lines are sampled are not permanently assigned to subscribers lines, but are allocated to these lines when the connection is initiated. Several systems of this type are well known. With such as system, the same general principle is applicable as has been described for the fixed pulse system. However, a special line from which a connection can be established using two time positions, is allocated a special class of service indication which serves to "tell" the control equipment to set up two separate connections on suitably-spaced time-position pulses. As in the previous case, the two pulses used for the same connection should preferably be equi-spaced in the time division cycle, or as near equi-spaced as is possible.

What we claim is:

1. An automatic telecommunications system comprising a switching network having a plurality of inlets and outlets with crosspoints therebetween, means for selectively operating said crosspoints to interconnect selected inlets and outlets, a plurality of two wire circuits connected to some of said inlets, a plurality of four wire circuits connected to others of said inlets, route selector means for setting up paths from any inlet through any available crosspoints in said network to any outlet, and means for operating said route selector means to complete a single path from two wire circuit inlets through said network and to complete a pair of parallel paths from said four wire circuit inlets through said network to a selected outlet, said pair of said paths being selected independently of each other so that said pair of paths are not directly associated with each other except during any given call.

2. The system of claim 1 and means for sending signals over one of said pair of paths, and means for receiving signals over the other of said pair of paths.

3. The system of claim 1 and means connected to the inlets and outlets of said switching network for processing digital signals, means for coupling a first of said digit processing means to one end of said switch path for receiving digital signals, and means for coupling second digit processing means to the other end of another switch path for sending digital signals.

4. The system of claim 1 wherein said switching network comprises a plurality of space division switches.

5. The system of claim 1 wherein said switching network comprises a plurality of time division multiplex gate switches.

6. The system of claim 5 wherein said pair of parallel paths comprises means operative responsive to a pair of time position signals which are substantially equi-spaced within a time division multiplex cycle.

7. An automatic telecommunication exchange comprising a space division switching network having inlets and outlets via which communication connections can be set up, a plurality of lines comprising subscriber lines and interchange junctions coupled to the inlets and outlets of said network, some of said lines being two wire line and other of said lines being four wire lines, common control means for controlling the establishment of connections through said network, means whereby a single connection is completed through said network when a call is established between two wire ones of said lines, and means whereby a pair of connections are independently completed through said network when a call is established between four wire ones of said lines, one of said pair of connections serving to transmit signals in a first direction from one of said four wire lines through said network to another of said four wire lines and the other of said pair of connections serving to transmit signals in an opposite direction from said other four wire lines through said network to said one four wire line.

References Cited by the Examiner

UNITED STATES PATENTS

| | | | |
|---|---|---|---|
| 2,495,739 | 1/1950 | Labin et al. | 179—15 |
| 2,564,419 | 8/1951 | Bown | 179—15 |

KATHLEEN H. CLAFFY, *Primary Examiner.*

WILLIAM C. COOPER, *Examiner.*